United States Patent [19]

Nakamura et al.

[11] Patent Number: 6,051,265

[45] Date of Patent: *Apr. 18, 2000

[54] PROCESS FOR PREPARATION OF SOYBEAN PROTEIN

[75] Inventors: Yasushi Nakamura, Ibaraki-ken; Yasuo Otani, Izumisano; Motohiko Hirotsuka, Kyoto, all of Japan

[73] Assignee: Fuji Oil Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/992,513

[22] Filed: Dec. 17, 1997

[30] Foreign Application Priority Data

Dec. 19, 1996 [JP] Japan .................................. 8-339216

[51] Int. Cl.⁷ .......................... A23C 9/14; A23L 1/20; A23J 1/00
[52] U.S. Cl. .................... 426/271; 426/634; 426/656
[58] Field of Search .................... 426/634, 271, 426/656

[56] References Cited

U.S. PATENT DOCUMENTS

| | | | |
|---|---|---|---|
| 3,288,614 | 11/1966 | Miles | 426/598 |
| 3,914,443 | 10/1975 | Sakita et al. | 426/802 |
| 3,970,764 | 7/1976 | Karnofsky | 426/430 |
| 4,186,218 | 1/1980 | Gomi et al. | 426/634 |
| 4,247,574 | 1/1981 | Utena et al. | 426/802 |
| 4,855,159 | 8/1989 | Takeo et al. | 426/634 |

FOREIGN PATENT DOCUMENTS

| | | |
|---|---|---|
| 0 466524 A1 | 7/1991 | European Pat. Off. . |
| 59-232052 | 12/1984 | Japan . |
| 4-281752 | 11/1992 | Japan . |

OTHER PUBLICATIONS

Patent Abstracts of Japan for Application No. 06–263829 filed Oct. 27, 1994, May. 14, 1996.

*Primary Examiner*—Anthony J. Weier
*Attorney, Agent, or Firm*—Armstrong, Westerman, Hattori, McLeland And Naughton

[57] ABSTRACT

A process for preparing a separated soybean protein, by the steps of preparing an aqueous slurry of defatted soybeans, removing water-insoluble components from the slurry and collecting a protein component from the obtained soybean milk, wherein in preparing an aqueous slurry of defatted soybeans, an antioxidant and a chelating agent are added, or at least one member selected from the group consisting of ascorbic acid, erythorbic acid and their salts is added in an amount of at least 0.1 part by weight per 100 parts by dry weight of the defatted soybeans. The process gives a soybean protein which shows improved resistance to discoloration when heat-treated at a high temperature.

5 Claims, No Drawings

PROCESS FOR PREPARATION OF SOYBEAN PROTEIN

FIELD OF THE INVENTION

The present invention relates to a process for preparing soybean proteins which show improved resistance to discoloration when heat-treated at a high temperature.

PRIOR ART

Generally separated soybean proteins are prepared by the following method.

First, water is added to defatted soybeans to give a slurry. The slurry is fractionated into soybean milk and bean-curd refuse by centrifugation, filtration or the like. An acid is added to the soybean milk to precipitate a soybean protein by isoelectric precipitation. Thus, the soybean protein is separated from whey as a supernatant. The curd-like precipitate of protein obtained by isoelectric precipitation is neutralized with an alkali and dried, giving a separated soybean protein.

Various methods have been reported for improving the properties of separated soybean proteins such as gel properties, flavor, color and solubility by altering the preparation conditions, e.g., an extraction temperature, salt concentration, ion strength and pH in such conventional methods of preparing separated soybean proteins.

Among these methods, methods of improving the color of separated soybean proteins are reported, for example, in Japanese Unexamined Patent Publication No.232052/1984 wherein isoflavones existing in soybeans is removed by adsorption using a porous adsorptive aromatic resin; and in Japanese Unexamined Patent Publication No.281752/1992 wherein an aqueous solution of fumaric acid or its salt is used in grinding process or extracting process of soybeans or defatted soybeans to improve the flavor or color of the obtained soybean milk or soybean protein solution.

However, while the separated soybean proteins obtained by these methods show an improved color when used under usual conditions, the proteins have a drawback of becoming discolored to a dark color due to heat when heat-treated under conditions of 120° C. for about 4 minutes or longer as in retort heating.

Consequently, when the separated soybean proteins obtained by conventional methods are used as a material for foods to be heated at a high temperature of not lower than 120° C. for a prolonged period of time, such as a material for a retort-packed beverage, the soybean proteins tend to undergo a color change to a dark color and thus pose a problem of having an apparently impaired color.

DISCLOSURE OF THE INVENTION

A primary object of the present invention is to provide a soybean protein which is kept from a color change to a dark color when subjected to prolonged high-temperature heat treatment, making it unlikely for a food to become impaired in quality even when used as a material for foods to be heat-treated at a high temperature such as retort-packed foods or fried foods.

The present inventors conducted extensive research to achieve said object and found the following. If in the conventional method for preparing soybean proteins, an antioxidant and a chelating agent in combination are added to an aqueous slurry of defatted soybeans when extracting a soybean protein by preparing the slurry, and a separated soybean protein is obtained from the slurry in the conventional manner, the separated soybean protein thus obtained shows a markedly improved resistance to discoloration as compared with conventional separated soybean proteins when heated at a high temperature. A further finding was that when ascorbic acid, erythorbic acid and/or their salts are used as an antioxidant in more than a specific amount without use of a chelating agent, the same effect as in combined use of the antioxidant and the chelating agent can be achieved. The present invention was completed based on these novel findings.

According to the present invention, there is provided a process for preparing a soybean protein, comprising the steps of preparing an aqueous slurry of defatted soybeans, removing water-insoluble components from the slurry to give soybean milk and collecting a protein component from the obtained soybean milk, wherein an antioxidant and a chelating agent in combination are added to the aqueous slurry of defatted soybeans when preparing the slurry. Also there is provided a process for preparing a soybean protein, comprising the steps of preparing an aqueous slurry of defatted soybeans, removing water-insoluble components from the slurry to give soybean milk and collecting a protein component from the obtained soybean milk, wherein at least one antioxidant selected from the group consisting of ascorbic acid, salt of ascorbic acid, erythorbic acid and salt of erythorbic acid is added to the aqueous slurry of defatted soybeans without use of a chelating agent when preparing the slurry, the amount of the antioxidant being 0.1 part by weight or more per 100 parts by dry weight of the defatted soybeans.

According to the processes of the present invention, it is essential to add an antioxidant and a chelating agent in combination or at least one of ascorbic acid, erythorbic acid and their salts in more than a specific amount when extracting a soybean protein by preparing an aqueous slurry of defatted soybeans in the conventional process comprising preparing an aqueous slurry of defatted soybeans, removing water-insoluble components from the slurry and collecting a protein component from the obtained soybean milk. If an antioxidant and a chelating agent are added after preparation of the slurry, e.g. added to the soybean milk after removal of water-insoluble components from the slurry, to the slurry after isoelectric precipitation, or in neutralization of the obtained precipitate, a satisfactory effect can not be achieved in inhibiting the discoloration due to prolonged high-temperature heating.

Useful defatted soybeans include those prepared in the conventional manner, as by compressing or crushing soybeans and defatting them with hexane or the like to provide undenatured defatted soybeans.

Examples of useful antioxidants are ascorbic acid, salt of ascorbic acid, erythorbic acid, salt of erythorbic acid, sodium sulfite, potassium sulfite, sodium hydrogensulfite, potassium hydrogensulfite, sodium hyposulfite, potassium hyposulfite, sodium pyrosulfite, potassium pyrosulfite and L-cysteine hydrochloride. These antioxidants can be used either alone or in combination. The type of salts for ascorbic acid and erythorbic acid includes sodium salt, potassium salt and the like. Among these antioxidants, preferred are ascorbic acid, salt of ascorbic acid, erythorbic acid, salt of erythorbic acid and the like.

The chelating agent to be used in the invention is preferably at least one member selected from the group consisting of ethylenediaminetetraacetic acid (EDTA), citric acid, hexametaphosphoric acid, tripolyphosphoric acid, polyphosphoric acid and salts thereof. The type of salts includes, for example, sodium salt, potassium salt and the like. Among useful chelating agents, EDTA or Na salt thereof are the most effective, but the soybean protein obtained using them is undesirable to use for foods. For this reason, EDTA and Na salts thereof are suitable to use for other purposes than for foods. In applications for foods, hexametaphosphoric acid, citric acid and sodium salts thereof are preferred.

A slurry can be prepared in the conventional manner. Usually a slurry is made by adding water to defatted soybeans and stirring the mixture. Preferred stirring methods are those wherein a low shearing force is exerted as by a propeller mixer, not those wherein a high shearing force is exerted using a homogenizer or a homomixer, because the obtained soybean protein is imparted a higher quality in the former case. A proper temperature in stirring is about 10 to about 50° C., preferably about 20 to about 30° C. The amount of water to be added is about 5 to about 20 times, preferably about 10 to about 15 times, the dry weight of defatted soybeans. A stirring time is about 30 to about 90 minutes.

The amount of the antioxidant to be added is about 0.01 to about 1 part by weight, preferably about 0.05 to about 0.5 part by weight, per 100 parts by dry weight of the defatted soybeans.

If the amount of the antioxidant used is less than said range, only a low effect is produced in inhibiting the discoloration when the obtained soybean proteins are heated at a high temperature. If the amount is more than said range, a higher effect than the specified level is not produced. If the antioxidant is used in an excessive amount, the obtained soybean protein becomes slightly yellowish.

A suitable amount of the chelating agent to be used is about 0.01 to about 1 part by weight, preferably about 0.10 to about 0.6 part by weight per 100 parts by dry weight of the defatted soybeans. If the amount of the chelating agent is less than the above range, the soybean protein is less able to inhibit a color change when heated to a high temperature, whereas a more amount thereof can not improve the ability to inhibit a color change better than to a specified extent. An excess amount of the chelating agent gives a yellowish color to the obtained soybean protein.

When at least one of ascorbic acid, erythorbic acid and their salts is used as an antioxidant in an amount of about 0.1 part by weight or more, preferably about 0.3 part by weight or more, per 100 parts by dry weight of defatted soybeans without use of a chelating agent, the discoloration of soybean proteins in prolonged high-temperature heating can be prevented in the same degree as in the combined use of a chelating agent. The upper limit on the amount of the antioxidant to be used in this case is about 3 parts by weight per 100 parts by dry weight of the defatted soybeans.

The antioxidant and the chelating agent may be added to water before stirring the mixture of water and defatted soybeans, or added to the mixture during stirring the mixture for preparation of the slurry.

According to the process of the invention, after preparing the aqueous slurry of defatted soybeans in the above method, separated soybean proteins can be prepared by removing water-insoluble components from the slurry and collecting a protein component from the obtained soybean milk, both in the conventional manner.

The water-insoluble components can be removed usually by filtration, centrifugation or the like from the slurry prepared by the above-mentioned method.

Then, a protein component is separated and collected from the obtained soybean milk. The separation and collection can be done by various methods such as a method wherein an acid is added to precipitate the protein component by isoelectric point precipitation, a method wherein an alcohol is added to precipitate the protein component, a method wherein a calcium salt is added to precipitate the protein component, a method wherein a whey component is removed by dialysis using an ultrafiltration (UF) membrane or the like to concentrate the protein component.

Thereafter water is added to the collected protein component, the solution is neutralized and sterilized, and spray drying is conducted to give the contemplated separated soybean protein.

If the separated soybean protein thus obtained is subjected to retort heating in the form of a gel or a solution, the discoloration of a protein after heating is markedly inhibited as compared with conventional separated soybean proteins, and the impairment of color is alleviated without color change to a dark color.

Turning from their color to their flavor, the separated soybean proteins of the invention have an advantage of mitigating the so-called retort odor.

The separated soybean proteins prepared according to the invention show an improved resistance to discoloration when heat-treated at a high temperature of 120° C. for at least 4 minutes as in retort heating, and exhibit superior properties as a material for foods such as retort-packed foods or for foods to be fried by heating at a high temperature.

EXAMPLES

The present invention is described below in more detail with reference to the following Examples.

Example 1 and Comparative Example 1

Five aqueous solutions were prepared by dissolving sodium ascorbate (abbreviated to "As-Na" in Table 1) in water. Each aqueous solution contained 0.01, 0.05, 0.20, 0.50 or 1.0 part by weight of sodium ascorbate per 1000 parts by weight of water. The five solutions were used for extracting a soybean protein. After each solution was placed into a 2 l vat of stainless steel, 100 parts by weight of defatted soybeans (product of FUJI OIL CO., LTD.) was added. A slurry of defatted soybeans was prepared by operating a 4-blade propeller 8 cm in diameter at 400 r.p.m. at 25° C. for 30 minutes, whereby the soybean protein was extracted. For a comparative purpose, a slurry was also obtained in the same manner as above using water free of sodium ascorbate.

Thereafter the slurry was filtered with filter fabric to remove bean-curd refuse. The filtrate was centrifuged at 2500 r.p.m. for 10 minutes to remove the precipitate, whereby defatted soybean milk was obtained. The obtained defatted soybean milk was adjusted to a pH of 4.5 with hydrochloric acid to precipitate the protein component by isoelectric precipitation. Centrifugation was carried out at 2500 r.p.m. for 10 minutes to obtain a curd precipitated with the acid. After addition of water to the curd, sodium hydroxide was added to adjust the pH of the resulting mixture to 7.0. The mixture had a solids content of 10%. Subsequently, the mixture was subjected to VTIS sterilization (140° C., 7 seconds). Then, separated soybean proteins (Samples Nos. C-1 to C3, and T-1 to T-3) were obtained by spray drying.

Example 2

To an aqueous solution of 0.30 part by weight of sodium citrate in 1000 parts by weight of water was added sodium ascorbate in an amount of 0.01, 0.05, 0.20, 0.50 or 1.0 part by weight so that the sodium ascrobate was dissolved in the aqueous solution. In this way, five aqueous solutions were prepared. Separated soybean proteins (Samples Nos. T-4 to T-8) were obtained under the same conditions as in Example 1 and Comparative Example 1 except that the five solutions were used for extracting the soybean protein.

Comparative Example 2

Sodium citrate was dissolved in water to give five aqueous solutions. Each aqueous solution contained 0.01, 0.05, 0.20, 0.50 or 1 part by weight of sodium citrate per 1000 parts by weight of water. Separated soybean proteins (Samples Nos. C-4 to C-8) were obtained under the same conditions as in Example 1 and Comparative Example 1 except that the five solutions were used for extracting the soybean protein.

Comparative Example 3

After 1000 parts by weight of water was placed into a 2 l vat of stainless steel, 100 parts by weight of defatted soybeans (product of FUJI OIL CO., LTD.) was added. A slurry was made by operating a 4-blade propeller 8 cm in diameter at 400 r.p.m. at 25° C. for 30 minutes, whereby a soybean protein was extracted. Thereafter the slurry was filtered with filter fabric to remove bean-curd refuse. The filtrate was centrifuged at 2500 r.p.m. for 10 minutes, producing defatted soybean milk.

To the obtained defatted soybean milk were added 0.25 part by weight of sodium ascorbate and 0.30 parts by weight of sodium citrate to obtain a solution. The solution was left to stand for 10 minutes, and adjusted to a pH of 4.5 with hydrochloric acid to precipitate the protein component by isoelectric precipitation. Centrifugation was carried out at 2500 r.p.m. for 10 minutes to obtain a curd precipitated at an isoelectric point. After addition of water to the curd, sodium hydroxide was added to adjust the pH of the resulting mixture to 7.0. The mixture had a solids content of 10%. Subsequently the mixture was subjected to VTIS sterilization (140° C., 7 seconds). Then, a separated soybean protein (Sample No. C-9) was obtained by spray drying.

Comparative Example 4

After 1000 parts by weight of water was placed into a 2 l vat of stainless steel, 100 parts by weight of defatted soybeans (product of FUJI OIL CO., LTD.) was added. A slurry was made by operating a 4-blade propeller 8 cm in diameter at 400 r.p.m. at 25° C. for 30 minutes, whereby soybean protein was extracted. Thereafter the slurry was filtered with filter fabric to remove bean-curd refuse. The filtrate was centrifuged at 2500 r.p.m. for 10 minutes, producing defatted soybean milk.

The obtained defatted soybean milk was adjusted to a pH of 4.5 with hydrochloric acid to precipitate the protein component by isoelectric precipitation. To the obtained slurry containing the precipitate were added 0.25 part by weight of sodium ascorbate and 0.30 parts by weight of sodium citrate. Subsequently the slurry was left to stand for 10 minutes. Centrifugation was carried out at 2500 r.p.m. for 10 minutes to obtain a curd precipitated at an isoelectric point. After addition of water to the curd, sodium hydroxide was added to adjust the pH of the resulting mixture to 7.0. The mixture had a solids content of 10%. Subsequently, the mixture was subjected to VTIS sterilization (140° C., 7 seconds). Then, a separated soybean protein (Sample No. C-10) was obtained by spray drying.

Comparative Example 5

After 1000 parts by weight of water was placed into a 2 l vat of stainless steel, 100 parts by weight of defatted soybeans (product of FUJI OIL CO., LTD.) was added. A slurry was prepared by operating a 4-blade propeller 8 cm in diameter at 400 r.p.m. at 25° C. for 30 minutes, whereby a soybean protein was extracted. Thereafter the slurry was filtered with filter fabric to remove bean-curd refuse. The filtrate was centrifuged at 2500 r.p.m. for 10 minutes, thereby producing defatted soybean milk.

The obtained defatted soybean milk was adjusted to a pH of 4.5 with hydrochloric acid to precipitate the protein component by isoelectric precipitation. Centrifugation was carried out at 2500 r.p.m. for 10 minutes to obtain a curd precipitated at an isoelectric point. To the obtained curd were added 0.25 part by weight of sodium ascorbate and 0.30 part by weight of sodium citrate, and further added water and sodium hydroxide to obtain a mixture adjusted to a pH of 7.0 and having a solids content of 10%. The mixture was subjected to VTIS sterilization (140° C., 7 seconds). Then, a separated soybean protein (Sample No. C-11) was obtained by spray drying.

Experiment Example 1

The separated soybean proteins obtained in Examples 1 and 2 and Comparative Examples 1 to 5 were heat-treated at high temperatures for a prolonged period of time under the conditions listed below in Table 1. The degree of discoloration was evaluated.

Heat-treating Conditions and Evaluation of Discoloration Degree

Each separated soybean protein (5 parts by weight) was dissolved in 95 parts by weight of water to obtain a 5% solution. The solution (100 ml) was placed into an Erlenmeyer flask. The opening of the flask was closed with a silicone plug. The contents of the flask were heated at 120° C. for 20 minutes in an autoclave. After heating, the Erlenmeyer flask was left to cool to room temperature. The degree of discoloration was determined according to 10 panelists' organoleptic evaluation on the basis of a maximum of 5 points. The symbol A means an excellent effect. The symbol B means a good effect. The symbol C means a fair effect. The symbol D means no effect. Table 1 below shows the results of evaluation.

TABLE 1

| Sample No. | C-1 | C-2 | C-3 | T-1 | T-2 | T-3 | T-4 |
| --- | --- | --- | --- | --- | --- | --- | --- |
| Stage for addition of antioxidant | In preparation of slurry | In preparation of slurry | In preparation of slurry | In preparation of slurry | In preparation of slurry | In preparation of slurry | In preparation of slurry |

TABLE 1-continued

| | | | | | | | |
|---|---|---|---|---|---|---|---|
| AS-Na (Wt part) | — | 0.01 | 0.05 | 0.20 | 0.5 | 1.0 | 0.01 |
| Sodium citrate (Wt Part) | — | — | — | — | — | — | 0.30 |
| Color state after heating | Changed to dark black color | Changed to dark black color | Changed to dark black color | Slightly attenuated blackness | Slightly red, attenuated blackness | Slightly red, attenuated blackness | Slightly dark, Opaque |
| Evaluation | D | D | D | B-C | B | B | B |

| Sample No. | T-5 | T-6 | T-7 | T-8 | C-4 | C-5 |
|---|---|---|---|---|---|---|
| Stage for addition of antioxidant | In preparation of slurry | In preparation of slurry | In preparation of slurry | In preparation of slurry | In preparation of slurry | In preparation of slurry |
| AS-Na (Wt part) | 0.05 | 0.20 | 0.50 | 1.0 | — | — |
| Sodium citrate (Wt Part) | 0.30 | 0.30 | 0.30 | 0.30 | 0.01 | 0.05 |
| Color state after heating | Slightly dark opaque | Pale yellow light opaque | Pale yellow light opaque | Pale yellow light opaque | Changed to dark black color | Changed to dark black color |
| Evaluation | B | A | A | A | D | D |

| Sample No. | C-6 | C-7 | C-8 | C-9 | C-10 | C-11 |
|---|---|---|---|---|---|---|
| Stage for addition of antioxidant | In preparation of slurry | In preparation of slurry | In preparation of slurry | Soybean milk | Slurry containing precipitate at isoelectric point | Curd precipitated at isoelectric point |
| AS-Na (Wt part) | — | — | — | 0.25 | 0.25 | 0.25 |
| Sodium citrate (Wt Part) | 0.20 | 0.50 | 1.0 | 0.30 | 0.30 | 0.30 |
| Color state after heating | Changed to dark color black | Slightly attenuated black | Slightly attenuated black | Slightly attenuated black | Slightly attenuated | Changed to dark black color |
| Evaluation | D | D-C | C | C | D-C | D |

The following is apparent from Table 1. Even when heated at a high temperature of 120° C. for a long time, the separated soybean proteins obtained by the process of the present invention (T-1 to T-8) were not changed in color to a dark black color unlike the separated soybean proteins obtained by conventional production methods, and were resistant to discoloration and superior in organoleptic properties.

The foregoing results show that in order to inhibit the discoloration of a soybean protein in heating at a high temperature for a long time, it is effective to add an antioxidant and a chelating agent in combination or sodium ascorbate as an antioxidant in an amount of at least 0.1 part by weight per 100 parts by weight of defatted soybeans in preparing a slurry to extract a soybean protein from defatted soybeans as the starting material.

We claim:

1. A process for preparing a soybean protein, comprising the steps of preparing an aqueous slurry of defatted soybeans, removing water-insoluble components from the slurry to give soybean milk and collecting a protein component from the obtained soybean milk, wherein the defatted soybeans are defatted soybeans prepared by being defatted with hexane, and an antioxidant and a chelating agent in combination are added to the aqueous slurry of defatted soybeans when preparing the slurry.

2. The process according to claim 1, wherein the antioxidant is at least one member selected from the group consisting of ascorbic acid, salt of ascorbic acid, erythorbic acid, salt of erythorbic acid, sodium sulfite, potassium sulfite, sodium hydrogensulfite, potassium hydrogensulfite, sodium hyposulfite, potassium hyposulfite, sodium pyrosulfite, potassium pyrosulfite and L-cysteine hydrochloride.

3. The process according to claim 1 or 2, wherein the chelating agent is at least one member selected from the group consisting of ethylenediaminetetraacetic acid (EDTA), citric acid, hexametaphosphoric acid, tripolyphosphoric acid, polyphosphoric acid and salts thereof.

4. The process according to any one of claims 1 or 2, wherein the amount of the antioxidant is about 0.01 to about 1 part by weight, per 100 parts by dry weight of the defatted soybeans, and wherein the amount of the chelating agent is about 0.01 to about 1 part by weight, per 100 parts by dry weight of the defatted soybeans.

5. A process for preparing a soybean protein, comprising the steps of preparing an aqueous slurry of defatted soybeans, removing water-insoluble components from the slurry to give soybean milk and collecting a protein component from the obtained soybean milk, wherein the defatted soybeans are defatted soybeans prepared by being defatted with hexane, and at least one antioxidant selected from the group consisting of ascorbic acid, salt of ascorbic acid, erythorbic acid and salt of erythorbic acid is added to the aqueous slurry of defatted soybeans without use of a chelating agent when preparing the slurry, the amount of the antioxidant being 0.1 part by weight or more per 100 parts by dry weight of the defatted soybeans.

* * * * *